United States Patent Office 2,968,634
Patented Jan. 17, 1961

2,968,634

HYDROCARBON CONVERSION CATALYSTS

Paul G. Nahin, Brea, Calif., assignor to Union Oil Company of California, Los Angeles, Calif., a corporation of California No Drawing. Original application Sept. 24, 1951, Ser. No. 248,097, now Patent No. 2,867,581, dated Jan. 6, 1959. Divided and this application Sept. 22, 1958, Ser. No. 762,261

8 Claims. (Cl. 252—465)

This invention relates to catalysts which may be employed to advantage in the reforming of petroleum hydrocarbons and pertains particularly to catalysts which are specifically adapted to the reforming of petroleum hydrocarbon stocks which contain contaminating sulfur compounds.

The term "reforming" as it pertains to the reforming of hydrocarbons carries a broad connotation and includes many specific types of hydrocarbon conversion reactions and processes. Hydrocarbon conversion reactions such as aromatization, cyclization, hydrogenation and dehydrogenation, isomerization, alkylation, and polymerization are included, for example. The petroleum hydrocarbon reforming processes of desulfurization and hydroforming or catalytic reforming in the presence of hydrogen include more particularly the specific hydrocarbon reactions of hydrogenation, dehydrogenation, cyclization and aromatization. In nearly all of these reactions, catalysts have been employed to accelerate the rate of reaction with varying degrees of success. Such catalysts generally comprise a major proportion of a suitable carrier or support, and a minor proportion of a suitable catalytic agent, although sometimes the catalytic agent is unsupported and used alone. The foregoing reactions are generally carried out by contacting hydrocarbons with a catalyst at a temperature between about 500° and 1500° F.

Catalyst carriers which have proved satisfactory comprise such refractory oxides as silica, titania, magnesia, alumina, thoria, and zirconia and, in general, any refractory oxide which provides an extended surface will serve as a satisfactory catalyst carrier.

The catalytic agents which are useful in the reforming of petroleum hydrocarbons include compounds of heavy metals having an atomic number between 22 and 42. Of these metals cobalt and nickel in conjunction with compounds of molybdenum are particularly useful. Thus, for example, in hydrogenation or dehydrogenation of petroleum hydrocarbons, oxides of cobalt and molybdenum or of nickel and molybdenum may be employed. These metal oxides or the corresponding sulfides are preferably supported or distended upon a suitable carrier to form the most effective catalyst. This invention is particularly directed to hydroforming, catalytic reforming, and desulfurization processes.

The hydroforming process for the reforming of petroleum hydrocarbon fractions includes such reactions as olefin hydrogenation, naphthene dehydrogenation, paraffin dehydrogenation and cyclization, and aromatization. Hydroforming is particularly well adapted to upgrading or increasing the octane rating of certain petroleum hydrocarbon fractions. Catalysts which are particularly well adapted for use in the hydroforming process contain between about 5 and 20% of molybdenum trioxide ($MoO_3$) distended on an alumina carrier. A petroleum hydrocarbon fraction, often a naphtha boiling in the gasoline range and preferably free of contaminating sulfur compounds, is vaporized, mixed with added hydrogen and passed over the molybdenum oxide catalyst at an average temperature of about 900° F. at a pressure between about 150 and 300 lbs. per sq. in. Under these conditions, the hydrogenation, dehydrogenation, aromatization, and cyclization reactions previously mentioned are accelerated and the product which is obtained contains a low percentage of olefins and a substantially increased concentration of aromatic hydrocarbons.

In the hydroforming of certain petroleum hydrocarbon fractions, limited amounts of contaminating sulfur compounds may be tolerated and these are mostly converted to hydrogen sulfide and aromatic hydrocarbons. Sulfur compounds when present in substantial quantity exert a deleterious effect on the catalyst. Many petroleum naphthas contain relatively large percentages of contaminating sulfur compounds. Naphthas which are produced from certain California and West Texas crude petroleum are subject to this problem. As such, these naphthas are not directly suited for use in internal combustion engines or as solvents because of low octane rating and odor and corrosion objections due to the high sulfur content. These petroleum hydrocarbons may be improved by catalytic reforming in contact with the catalyst of this invention.

Supported catalysts containing cobalt and molybdenum have been prepared and described in U.S. Patent 2,393,288 issued to A. C. Byrns. The catalysts described therein were prepared by coprecipitating cobalt and molybdenum oxides in molecular combination as cobalt molybdate along with, or in the presence of, a suitable carrier such as alumina. A supported coimpregnated cobalt molybdate catalyst has been described in U.S. Patent 2,486,361 issued to P. G. Nahin et al.

It is a primary object of this invention to provide an improved catalyst for the reforming of petroleum hydrocarbons and particularly for reforming those petroleum hydrocarbons containing substantial quantities of contaminating sulfur compounds.

It is another object of this invention to prepare improved cobalt-molybdenum and nickel-molybdenum catalysts supported on suitable carriers by a two step alternate impregnation procedure.

It is another object of this invention to simplify the preparation of supported nickel and cobalt catalysts containing molybdenum and to improve the catalytic activities of such catalysts.

Another object of this invention is to provide a catalyst which is not deleteriously affected by sulfur compounds contained in petroleum hydrocarbons.

It is yet a further object of this invention to provide a catalyst for the hydroforming process which not only is not susceptible to the poisoning effects normally resulting from the presence of contaminating sulfur compounds in the particular petroleum hydrocarbon fraction to be reformed, but a catalyst which will simultaneously promote an efficient desulfurization of the particular petroleum fraction.

A further object of this invention is to provide a catalyst which has an improved heat stability, an improved initial activity, and an extended life.

A still further object of this invention is to provide a catalyst which is particularly adapted to the simultaneous desulfurization and hydroforming of petroleum hydrocarbons and which is modified so that the amount of coke deposition on the catalyst is markedly decreased.

Other objects and advantages of this invention will become apparent to those skilled in the art as the description thereof proceeds.

Briefly, this invention embraces a new catalyst which is adapted to the catalytic reforming of petroleum hydrocarbon fractions and particularly to the simultaneous desulfurization and hydroforming at temperatures of from about 500° to 1500° F. and at pressures between about 5 and 2500 lbs. per sq. in. absolute of such petroleum hydrocarbon fractions which contain relatively large amounts of contaminating sulfur compounds. The catalyst of this invention comprises a minor proportion of an active catalytic agent supported on a major proportion of a suitable refractory oxide carrier. The active catalytic agent of the catalyst of this invention comprises a compound and/or mixture of oxides of cobalt and molybdenum or a compound and/or mixture of oxides of nickel and molybdenum. These catalysts are prepared by a two step alternate impregnation procedure wherein the nickel and/or cobalt compounds are deposited on the carrier in the one impregnation step and the molybdenum compound is deposited in the other impregnation step. In the preferred modification the deposition of the molybdenum precedes the deposition of the cobalt and/or nickel. These catalytic agents may be distended upon a refractory oxide carrier such as, for example, silica, titania, alumina, magnesia, thoria, and zirconia, or mixtures thereof.

While the principal feature of this invention relates to a new method for the preparation of catalysts and methods of using such catalysts, it has also been found that the catalysts which are prepared by this method, so as to contain only small amounts of cobalt such as 0.1 to 2.0% by weight of cobalt oxide, show an unusual and unexpected resistance to poisoning with sulfur compounds. Catalysts containing small amounts of nickel behave similarly. The addition of small amounts of these metals alter the characteristics of the resulting catalyst so that it catalyzes the aromatization reaction leading to the formation of aromatic type hydrocarbons from naphthenes and paraffins and simultaneously resists the deleterious action upon the catalyst of sulfur compounds which appear to accumulate on the conventional molybdenum oxide catalyst and progressively impair its activity between regenerations. The addition of small amounts of added metal compounds also increases the life of the catalyst by stabilizing the catalytic agent which is distended upon the carrier and in some cases the catalyst actually increases in activity with use.

The preparation of the catalyst of this invention is effected by impregnation of the carrier in two separate and distinct steps. A suitable absorbent carrier, e.g., activated alumina, alumina-silica, titania, or the like, is first activated by heating in order to render it sufficiently absorbent to be impregnated. Such activation may, for example, be effected by heating for 2 to 6 hours at about 300° to 600° C. (572 to 1112° F.). The carrier is then cooled and immersed in an aqueous solution of a soluble molybdenum-containing salt such as, for example, an ammoniacal ammonium molybdate solution. The impregnation solution is absorbed by the carrier and the excess impregnation solution is thereafter removed. The impregnated carrier is drained and dried in a low temperature oven to remove the bulk of the water and ammonia and render the carrier absorbent. Drying at low temperatures, such as below 300° F., renders the impregnated carrier sufficiently absorptive for the subsequent impregnation step but does not convert the molybdenum salt to the oxide. The carrier supporting the impregnated ammonium molybdate is thereafter immersed in an aqueous solution of a soluble cobalt-containing salt such as, for example, aqueous cobaltous nitrate. The reimpregnated carrier is drained of the excess solution, dried, and then heated to a temperature sufficient to decompose simultaneously the cobalt-containing salt and the molybdenum-containing salt to form the corresponding metal oxides and/or compounds thereof such as cobalt molybdate.

The activation of the impregnated carrier is effected by heating at 300° to 600° C. (572 to 1112° F.) for 1 to 10 hours, for example. In certain cases the final activation may be effected by charging the catalyst to the reactor and completing the activation by blowing with hot gases, such as hydrogen, at or near the reaction temperature. In any event, the finished catalyst prepared by this method is usually reduced in the presence of hydrogen at a temperature between 700° and 1100° F. prior to its use.

The carrier is normally shaped into the physical form desired for the catalyst prior to the impregnation steps. For this purpose the dried carrier is usually ground, mixed with a lubricant such as graphite or hydrogenated vegetable oil, and pilled. In the activation of the carrier the lubricant is removed by combustion. Alternatively, the carrier may be used in granular form or ground into powder and extruded. Where the catalyst is to be employed in a fluidized process, such as in fluidized desulfurization, denitrogenation, and the like, the carrier is formed into a finely divided state or is ground into a fine state and is thereafter impregnated. In the case of fluidized processes the carrier can be impregnated in larger physical form, e.g., granules, pills, etc., and thereafter ground to the desired powder size for the processing.

The molybdenum-containing impregnation solution is preferably ammoniacal ammonium molybdate although aqueous solutions of other soluble molybdenum compounds may be employed, such as molybdenum chloride, ammonium sulfomolybdate, and the like. In the preferred method, ammonium paramolybdate is dissolved in about 14% aqueous ammonia and the resulting mixture is diluted with distilled water or with more diluted aqueous ammonia to form a clear ammonium molybdate solution of the desired concentration. The concentration of the ammonium molybdate solution will depend on the particular carrier being employed and on the desired concentration of molybdenum in the finished catalyst. Where alumina or alumina-silica carriers are employed, and a finished catalyst comprising between about 6 to 16% of $MoO_3$ is desired, the molybdenum-containing impregnation solutions will have a concentration of molybdenum ranging from about 12 to 32 g. of $MoO_3$/ml.

The cobalt-containing impregnation solution is preferably an aqueous solution of cobaltous nitrate although other water soluble compounds of cobalt may be employed. Thus, cobalt chloride may be employed in the impregnation solutions, although it is more difficultly decomposed to an active form and requires both heat and oxidation to complete the final conversion to the oxide. The concentration of the cobalt-containing impregnation solution will depend upon the carrier being employed and the desired concentration of cobalt in the finished catalyst. Where alumina or alumina-silica carriers are employed and where a final catalyst composition containing from about 0.1 to 12% by weight of CoO is desired, the concentration of the cobalt impregnation solution will range from about 0.2 to 26 g. of CoO/100 ml.

The nickel-containing impregnation solution is preferably an aqueous solution of nickelous nitrate and it is prepared analogously to the preparation of the cobalt impregnation solution, wherein the concentration of equivalent grams of NiO/ml. coresponds to grams of CoO/ml.

The finished catalyst is useful for effecting various hydrocarbon conversion reactions such as desulfurization, denitrogenation, hydrogenation, hydroforming, reforming, cracking, destructive hydrogenation, and the like. Such reactions are carried out generally by contacting the catalyst with a hydrocarbon feedstock at a temperature between about 500° and 1500° F. and preferably in the presence of hydrogen such as recycle hydrogen gas. During usage, varying amounts of deposits comprising mostly carbon, nitrogen and sulfur compounds accumulate on the catalyst and are periodically removed by regeneration. Regeneration is effected by passing air diluted with flue gas, steam, nitrogen, or other inert gas over the catalyst to combust the deposits while maintaining the temperature of the catalyst between about 800° and 1050° F. The combustion is completed in the presence of undiluted air while maintaining the temperature of the catalyst between about 800° and 1050° F. The regenerated catalyst, after reduction with hydrogen, has practically the same catalytic activity as the freshly prepared catalyst even after a large number of regenerations.

For the purpose of desulfurizing petroleum stocks, shale distillates and the like, the catalyst of this invention is employed under the following conditions: reaction temperatures between about 600° to 1000° F., pressures between about atmospheric to 5000 lbs./sq. in. or more and at space velocities between about 0.2 and 10.0 vol. of liquid feedstock/vol. of catalyst/hr., and 500 to 10,000 cu. ft. of added hydrogen/bbl. of feed. The particular set of conditions is determined by the stock to be desulfurized and by the nature of the product desired.

The catalyst in this invention can also be employed for denitrogenation of such stocks as coal tar distillates, shale oils and heavy petroleum distillates whereby up to 99% of the nitrogen and substantially 100% of the sulfur can be removed simultaneously. For denitrogenation of such stocks the following conditions are employed: reactor temperatures between about 700° and 1000° F., pressures between about 500 and 10,000 lbs./sq. in., feed rated between about 0.2 and 10.0 vol. of liquid feedstock/vol. of catalyst/hr., and about 1,000 to 10,000 cu. ft. of added hydrogen/bbl. of feed. For the removal of nitrogen it is generally desirable to employ a two-stage denitrogenation process wherein the ammonia synthesized in the first stage is removed from the first stage product prior to its entry into the second stage denitrogenation and wherein the ammonia and hydrogen sulfide are removed from the recycle hydrogen gas streams in each stage. Under these conditions the maximum efficiency for removing nitrogen from the stocks is obtained.

The catalyst of this invention may also be employed for hydroforming, which process serves to reform a gasoline range hydrocarbon stock and increase its aromatic content. For processing stocks for the purpose of reforming and increasing their aromaticity, the following conditions are employed: reaction temperatures between about 800° and 1200° F., pressures between about 50 to 1000 lbs./sq. in., space velocities between about 0.2 and 4.0 vol. of liquid feedstock/vol. of catalyst/hr., and about 1,000 to 10,000 cu. ft. of added hydrogen/bbl. of feed. The specific conditions are determined by the nature of the specific feedstock employed and the quality of the product desired.

Perhaps the processes of this invention are best understood by reference to the following specific examples which are merely illustrative of this invention and are not intended to indicate or define limitations thereof.

*Example I*

Three molybdenum oxide catalysts on alumina carriers were prepared by impregnation of pelleted alumina in aqueous ammoniacal solutions of ammonium molybdate. The impregnated alumina carrier pellets were drained and dried at a low temperature and finally calcined for two hours at 600° C. (1112° F.). The alumina carrier contained about 5% silica, about 3% titania, about 0.5% iron oxide expressed as $Fe_2O_3$ and greater than 90% aluminum oxide. The duration of the alumina carrier impregnation and the concentration of the ammonium molybdate solutions were altered so that the three catalysts thus prepared contained different amounts of the active catalytic agent, molybdenum oxide, as follows:

| Catalyst: | Weight percent $MoO_3$ |
|---|---|
| No. 1 | 4.06 |
| No. 2 | 9.28 |
| No. 3 | 13.13 |

In order to determine the effect on the catalyst activity of petroleum naphthas which contain high percentages of contaminating sulfur, a Santa Maria Valley (California) straight-run gas oil was selected, which had the following characteristics:

| | |
|---|---|
| Boiling range, °F | 395–650 |
| Gravity, °API | 33.2 |
| Sulfur, percent by weight | 2.32 |

The gas oil was heated to a temperature of 750° F. under a pressure of 150 lbs./sq. in., mixed with hydrogen at a rate of 3,000 standard cu. ft./bbl. (s.c.f./bbl.) of feed, and passed over each of the catalysts previously mentioned in individual runs at a liquid hourly space velocity (LHSV) of 2.0 vol. of feed/vol. of catalyst (v./v.) for a process period of 6.0 hours. Samples of the product were taken and analyzed to determine the sulfur content and it was found the sulfur content increased with time throughout each run. This indicated that the catalysts were being quite rapidly poisoned by the presence of the sulfur although some degree of desulfurization was taking place. Throughout the six-hour period of the run the average sulfur contents of the products were 0.74, 0.51 and 0.45% by weight sulfur for catalyst Nos. 1, 2 and 3, respectively. The results of these analyses indicate that increasing the molybdenum oxide content of the catalyst tended to increase the degree of desulfurization. However, it showed conclusively that molybdenum oxide-alumina catalysts under these conditions were not suitable for the conversion of sulfur bearing stocks and were rapidly poisoned by the sulfur.

*Example II*

A cobalt oxide-alumina catalyst was prepared by impregnation of the pelleted alumina comprising the alumina carrier in an aqueous solution of cobalt nitrate containing about 0.56 g. of cobalt hexanitrate/ml. The impregnated pellets were drained and dried at a low temperature and subsequently calcined at a temperature of 600° C. (1112° F.) for a period of two hours. The resulting catalyst was analyzed and found to contain 6.24% by weight CoO. The gas oil used in testing the catalysts in Example I was passed over the cobalt oxide-alumina catalyst of the present example at a temperature of 750° F. and under a pressure of 150 lb./sq. in. Hydrogen was added at a rate of 3,000 s.c.f./bbl. of feed and an LHSV of 2.0 v./v. was used in a 6.0 hour run. Samples of the product were taken during the run and analyzed and found to contain successively increased amounts of sulfur. The average of the analyses was 1.11% by weight of sulfur and showed beyond doubt that the cobalt oxide-alumina catalyst alone is much more quickly poisoned by sulfur than the previous molybdenum oxide catalysts.

*Example III*

A cobalt oxide molybdenum oxide catalyst containing cobalt oxide as promoter supported on alumina was prepared by alternate impregnation with solutions of ammoniacal ammonium molybdate and with a cobalt nitrate solution. In the preparation of this catalyst the alumina was first immersed in ammoniacal ammonium molybdate solution which was prepared by dissolving about 98 parts by weight of ammonium paramolybdate (81% $MoO_3$) in a mixture of 225 parts by weight of 28% aqueous ammonium and 233 parts of distilled water. The impregnated carrier was drained and dried at about 220° F. overnight and was then immersed in an aqueous cobalt nitrate solution prepared by dissolving 61 parts by weight of cobalt nitrate hexahydrate in about 390 parts of distilled water. Following the cobalt nitrate impregnation the pelleted alumina catalyst was drained, dried at a low temperature, and calcined at a temperature of 600° C. (1112° F.) for a period of two hours. The catalyst analyzed 8.64% molybdenum oxide and 1.72% cobalt oxide.

When contacted with the Santa Maria Valley gas oil under the same conditions as the catalysts of Examples I and II, the average sulfur content over the period of six hours was 0.076% by weight sulfur which constitutes a nearly 97% complete desulfurization. The catalyst appeared to maintain its activity over the duration of the run and gave high yields of aromatic type hydrocarbons and a high overall liquid recovery. The individual sulfur analyses during the run showed very slowly increasing amounts of sulfur in the product, indicating that less than 2% cobalt oxide added to a molybdenum oxide catalyst served to markedly promote sulfur removal as well as to maintain the activity of the catalyst.

According to the average product sulfur data obtained from the three catalyst tests described in Example I, a molybdenum oxide-alumina catalyst containing no cobalt but which has 8.64% molybdenum oxide would be expected to yield under the present operating conditions a product having an average sulfur content of 0.53% by weight sulfur over a run period of six hours and the present catalyst containing 1.72% by weight of added cobalt oxide reduced the average sulfur content from an expected 0.53% by weight to 0.076% by weight.

*Example IV*

A cobalt oxide promoted molybdenum oxide-alumina catalyst was prepared by the procedure of Example III. After the calcining operation, which was carried out at 600° C. (1112° F.) for a period of 2.0 hours, the catalyst contained 1.96% by weight CoO and 10.3% by weight $MoO_3$. The catalyst was treated by contacting with the same Santa Maria Valley gas oil as used in testing the previous catalysts and analyzing the product at frequent intervals over the period of the run which lasted six hours. Contrary to the usually observed phenomenon of activity decrease with use, as shown either by increasing sulfur content or a decreasing aromatic content of the product, the sulfur content of the product formed during the run continuously decreased with an average value of 0.094% by weight sulfur. This indicates that under the temperature conditions of the run the activity of the catalyst increased rather than decreased and that the activity failed to decrease even a small amount during the six-hour period. This gas oil which contains such a high amount of sulfur, 2.32% by weight, represents a severe test for nearly any catalyst and the fact that the sulfur content of the product decreased during the run rather than increased is rather surprising.

*Example V*

A Santa Maria Valley pressure distillate was obtained which possessed the following properties:

| | |
|---|---|
| Boiling range, ° F. | 400–600 |
| Gravity, ° API | 52.0 |
| Olefins, percent by volume | 30 |
| Aromatics, percent by volume | 11 |
| Sulfur, percent by weight | 3.35 |

This feedstock was used in an even more severe testing of nickel promoted hydroforming catalyst. The nickel promoted molybdenum oxide-alumina catalyst was prepared by impregnation procedure of Example III. It was finally calcined for a period of two hours at a temperature of 600° C. (1112° F.). The catalyst was found to contain upon analysis 0.55% nickel oxide and 8.07% by weight molybdenum oxide. The hydroforming process was carried out under the following conditions:

| | |
|---|---|
| Temperature, ° F. | 950 |
| Pressure, p.s.i.g. | 150 |
| Added hydrogen, cu.ft./bbl. | 3000 |
| Space velocity (LHSV) | 1.0 |
| Process time, hours | 4.0 |

The average sulfur content of the samples of product taken during the period of the run was found to be 0.114% by weight sulfur, which constitutes a 96.5% sulfur removal. The aromatic content of the pressure distillate was increased from about 11% by volume to 37.5% by volume and the catalyst showed less than expected decrease in activity and coke deposition. The liquid yield, based on the quantity of feed, was 84.2% by volume.

The presence of added cobalt or nickel oxide in a molybdenum oxide-alumina catalyst functions to prevent a rapid loss in hydroforming activity by the action of sulfur and sulfur compounds, as shown in the above examples. The precise mechanism of the promoting action of the added metal compound (oxide) is not known. However, from the results obtained it appears that the promoter may effectively prevent an elevated temperature reaction between the molybdenum oxide or other catalytic agent and the alumina carrier. It also apparently inhibits the elevated temperature volatilization of the molybdenum oxide and it may stabilize the crystalline form of other catalytic agents and prevent a crystal rearrangement to a more stable and less active form. It is also possible in view of the results obtained that the addition of the cobalt and nickel promoter serves to alter somewhat the characteristics of the catalyst and modifies the initial high activity noted in the fresh catalyst. In so modifying the fresh catalyst activity there occurs a marked decrease in the high initial pyrolysis or cracking of the hydrocarbon feed being converted which oftentimes accompanies the reactions involved in the hydroforming process. In the use of the promoted catalysts of this invention in petroleum hydrocarbon reforming, the decrease in catalyst activity is considerably lessened, thereby increasing the life of the catalyst. It is shown that addition of the promoters of this invention serves to increase the heat stability of the catalyst, as indicated in the following example.

*Example VI*

A nickel promoted molybdenum oxide-alumina catalyst very similar in characteristics to that of the previous example was prepared by the alternate impregnation procedure employed in the preparation of the catalyst of Example III, with the exception that the catalyst was finally calcined at a temperature of 800° C. (1472° F.) for a period of six hours and upon analysis was found to contain 0.55% by weight nickel oxide and 7.58% by weight molybdenum oxide. Ordinarily a high temperature treatment of the type to which the catalyst was subjected during the six-hour calcination period is sufficient to decrease the activity of the catalyst markedly. Upon treating this nickel promoted catalyst with the pressure distillate having the same properties as the feed used in Example V, the average sulfur content in the product was found to be 0.065% by weight or a little more than 50% of the average sulfur in the products obtained during reforming of the feed over the catalyst of Example V. The liquid yield was found to be 86.4% by volume which is somewhat higher than the previous example. Upon comparison of the results obtained upon analysis of the products resulting from reforming of this pressure distillate over the catalysts of Examples V and VI, the heat stability of the catalyst prepared according to this invention is indicated.

In Examples III–VI the catalyst was prepared by first impregnating the carrier with the molybdenum-containing solution, secondly impregnating with the cobalt or nickel-containing solution and lastly thermally decomposing the impregnated salts. It is apparent that the order of impregnation may be reversed so that the cobalt or nickel is deposited first. The reversed technique produces a catalyst which is somewhat less active however.

In lower concentrations such as below 2% by weight, nickel and cobalt oxides exert a promoting action on catalysts of this invention and inhibit initial cracking of certain of the constituents contained in petroleum hydrocarbon fractions with an accompanying decrease in coke deposition on the catalyst. This latter effect aids in lengthening the life of the catalyst and also decreases the number of catalyst regenerations per unit time of operation. The improved catalysts of this invention contain from about 5 to about 20% by weight and preferably at least 8% by weight of the active catalytic agent, such as molybdenum oxide, etc., together with less than about 2% by weight of the oxides of cobalt or nickel and preferably between about 0.1 to 1.5% by weight of the oxides of cobalt and/or nickel. In some cases, as little as between about 0.1 and 0.9% by weight of the oxides of nickel or cobalt is effective in forming the improved catalysts of my invention.

While the desired promoting action may be obtained by using less than 2% of cobalt and/or nickel oxides, high concentrations of such oxides may be employed. Thus, catalysts may be prepared by the method of this invention which contain between about 5 to 20% by weight of molybdenum oxides and between about 0.1 to 12% by weight of cobalt and/or nickel oxides. Catalysts having high concentrations of both components are difficult to prepare by coimpregnation while the alternate impregnation technique of this invention is well suited for this purpose.

The catalysts of this invention are prepared by the alternate impregnation of a pelleted alumina carrier with aqueous solutions of salts of the metals which it is desired to impregnate on the carrier. The impregnation of molybdenum oxide and cobalt oxide, for example, may be performed by alternate impregnation of the pelleted carrier with solutions of ammonium molybdate and cobalt nitrate with the subsequent calcining of the catalyst to reduce the salts impregnated on the carrier to $MoO_3$ and CoO. The preferred carrier is alumina, although other absorbent carriers, such as magnesia, silica, titania, zirconia, thoria, treated clays, mixtures thereof or other refractory metal oxides are within the scope of this invention for supporting the promoted catalyst.

This application is a division of application Serial No. 248,097, filed September 24, 1951, now U.S. Patent No. 2,867,581, which is in turn a continuation-in-part of application, Serial No. 734,864, filed March 14, 1947, now abandoned.

The foregoing description and illustrations by means of examples of this invention are not to be considered as limiting since many variations thereof may be made of those skilled in the art without departing from the spirit and scope of the following claims.

I claim:
1. A hydrocarbon conversion catalyst consisting essentially of between about 8%–20% by weight of molybdenum oxide calculated as $MoO_3$, and a finite amount, less than 2% by weight of an oxide of a group VIII metal selected from the class consisting of cobalt and nickel, the remainder of said catalyst consisting of a refractory oxide carrier selected from the class consisting of alumina and alumina-silica mixtures, said catalyst being prepared by the alternate impregnation of said carrier in aqueous solutions of salts of said metals and calcining of the impregnated carrier to convert said salts to the corresponding oxides.

2. A catalyst as defined in claim 1 wherein said group VIII metal is cobalt.

3. A catalyst as defined in claim 1 wherein said group VIII metal is nickel.

4. A catalyst as defined in claim 1 wherein said carrier is essentially activated alumina.

5. A hydrocarbon conversion catalyst consisting essentially of between about 8% and 20% by weight of molybdenum oxide calculated as $MoO_3$ and between about 0.1% and 1.5% by weight of cobalt oxide, the remainder of said catalyst consisting essentially of a refractory oxide carrier selected from the class consisting of alumina and alumina-silica mixtures, said catalyst being prepared by the alternate impregnation of said carrier in aqueous solutions of salts of said metals and calcining of the impregnated carrier to convert said salts to the corresponding oxides.

6. A catalyst as defined in claim 5 wherein said carrier consists essentially of activated alumina.

7. A hydrocarbon conversion catalyst consisting essentially of between about 8% and 20% by weight of molybdenum oxide calculated as $MoO_3$ and between about 0.1% to 0.9% by weight of cobalt oxide, the remainder of said catalyst consisting essentially of a refractory oxide carrier selected from the class consisting of alumina and alumina-silica mixtures, said catalyst being prepared by the alternate impregnation of said carrier in aqueous solutions of salts of said metals and calcining of the impregnated carrier to convert said salts to the corresponding oxides.

8. A catalyst as defined in claim 7 wherein said carrier consists essentially of activated alumina.

References Cited in the file of this patent
UNITED STATES PATENTS

| | | |
|---|---|---|
| 2,687,370 | Hendricks | Aug. 24, 1954 |
| 2,687,381 | Hendricks | Aug. 24, 1954 |